(12) United States Patent
Sung et al.

(10) Patent No.: US 7,590,433 B2
(45) Date of Patent: Sep. 15, 2009

(54) PORTABLE ELECTRONIC DEVICE

(75) Inventors: Cheng-Hsin Sung, Taipei (TW); Hsien-Chih Ou, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 662 days.

(21) Appl. No.: 11/327,443

(22) Filed: Jan. 9, 2006

(65) Prior Publication Data

US 2007/0060214 A1   Mar. 15, 2007

(30) Foreign Application Priority Data

Sep. 14, 2005   (TW) ............... 94131716 A

(51) Int. Cl.
 *H04M 1/00* (2006.01)
(52) U.S. Cl. ............... 455/575.1; 455/575.3
(58) Field of Classification Search ............ 455/575.1, 455/556.1, 575.3, 90.1; 343/702; 348/14.02, 348/373
 See application file for complete search history.

(56) References Cited

U.S. PATENT DOCUMENTS

| | | | | |
|---|---|---|---|---|
| 5,640,689 | A * | 6/1997 | Rossi | 455/575.7 |
| 5,771,466 | A * | 6/1998 | Tsugane et al. | 455/575.7 |
| 6,249,744 | B1 * | 6/2001 | Morita | 701/213 |
| 6,658,272 | B1 * | 12/2003 | Lenchik et al. | 455/575.1 |
| 6,956,540 | B1 * | 10/2005 | Yoshihara et al. | 345/1.1 |
| 7,099,775 | B1 * | 8/2006 | Hanshew et al. | 701/213 |
| 7,539,526 | B2 * | 5/2009 | Pirila et al. | 455/575.3 |
| 2001/0004269 | A1 * | 6/2001 | Shibata et al. | 348/333.06 |
| 2002/0022460 | A1 * | 2/2002 | Lintern et al. | 455/97 |
| 2003/0060226 | A1 * | 3/2003 | Abood et al. | 455/550 |
| 2004/0209645 | A1 * | 10/2004 | Park et al. | 455/556.1 |
| 2005/0024277 | A1 * | 2/2005 | Hanshew et al. | 343/702 |
| 2005/0026658 | A1 * | 2/2005 | Soejima | 455/575.1 |
| 2005/0055161 | A1 * | 3/2005 | Kalis et al. | 701/213 |
| 2005/0113156 | A1 * | 5/2005 | Park et al. | 455/575.4 |

OTHER PUBLICATIONS http://www.asus.com.tw/products4.aspx?l1=8&l2=0&l3=0&model=80modelmenu=1.
http://www.garmin.com/products/iQueM5/.
http://www.garmin.com/products/quest2/.
http://www.garmin.com/products/etrexLegend/.

* cited by examiner

*Primary Examiner*—Edward Urban
*Assistant Examiner*—Ganiyu Hanidu
(74) *Attorney, Agent, or Firm*—Rabin & Berdo, P.C.

(57) ABSTRACT

A portable electronic device includes a body, a signal transmitter/receiver. The body includes a display which has a first display mode and a second display mode. The signal transmitter/receiver has a ball spiral, a first ball and a second ball. The signal transmitter/receiver is pivotally connected to the body of the portable electronic device. The signal transmitter/receiver can be rotated around a rotation axis defined by the first ball and the ball spiral to a first signal receiving position corresponding to the first display mode, and can be rotated around a rotation axis defined by the second ball and the ball spiral to a second signal receiving position corresponding to the second display mode. Therefore, signals can be better transmitted or received when the display is in a given display mode.

6 Claims, 7 Drawing Sheets

PORTABLE ELECTRONIC DEVICE

CROSS-REFERENCE TO RELATED APPLICATIONS

This non-provisional application claims priority under 35 U.S.C. § 119(a) on Patent Application No(s). 094131716 filed in Taiwan, R.O.C. on Sep. 14, 2005, the entire contents of which are hereby incorporated by reference.

BACKGROUND OF THE INVENTION

1. Field of Invention

The present invention relates to a portable electronic device, and more particularly, to a portable electronic device having a signal transmitter/receiver to receive or transmit wireless signals.

2. Description of Related Art

Portable electronic devices such as mobile phones, personal digital assistants (PDA) or hand-held personal computers, pocket personal computers, are easy to carry and enable users to search, save, or process information. Moreover, they may be used as multimedia for playing games, showing images or films, or playing music. Such portable electric devices have recently become the most popular electronic products. However, they still have not met the demand of consumers. Therefore, global positioning system (GPS) navigators that enable users to receive geographic information at anytime and anywhere have received increasing attention from consumers. Examples of GPS navigators include the products of, eTrex Legend, iQue® M5 Quest™ 2 produced by Garmin International Ltd (PI://3w.garmin.com/). The GPS navigator has a display and digital geographic maps embedded therein. The antenna of the GPS navigator receives low-power, ultra high frequency (UHF) wireless electronic signals from 24 satellites and five ground stations to thereby obtain positional information. With such information and its embedded digital maps, the GPS navigator can utilize its trip planning function to thereby obtain accurate positional information and directional information.

The display of the GPS navigator has two display modes: vertical and horizontal. For instance, the iQue® M5 produced by Garmin International Ltd. has a vertical-mode display, and Quest™ 2 has a horizontal-mode display. Vertical-mode GPS navigators may be easy to be held in hand, and horizontal-mode GPS navigators are more convenient for viewing broad scale of electronic maps. In order to provide more options for consumers, some manufacturers have introduced GPS navigators having displays that may change their display mode based on the position of the navigators. That is, when a GPS navigator is used in a vertical position, its display will be in the vertical mode, and when the GPS navigator is used in a horizontal position, its display mode will be switched to the horizontal mode. When a user holds a GPS navigator while walking, the display of the GPS navigator may be set to the vertical mode. When a user is driving, the display of the GPS navigator may be set to the horizontal mode to display broad scale of electronic maps.

The switchable display mode of GPS navigators have made the GPS navigators easier to use. However, when a user changes the position of the GPS navigator, the change may affect the transmission and reception of signals of the antenna of the GPS navigator. Taking the products of Garmin International Ltd., iQue® M5 and Quest® 2, as an example, both the products have an antenna connected to the body of the GPS navigator through a one-way pivot, so that the antenna can be received at the back of the body of the GPS navigator or can be rotated up to receive or transmit signals. However, if such a design is applied to GPS navigators with a switchable display mode, although the antenna could still be rotated up, the antenna's position after being rotated up will only match one type of display mode. For example, if the antenna is designed for a vertical display mode, when horizontal display mode is taken, the antenna cannot be totally rotated outward to sky to receive satellite signals. This problem may be solved by adopting a two-way hinge structure as is used in flip cell phones. However, in the two-way hinge structure, only one pivot is located at one end of the body of a GPS navigator. If the antenna is set to a position in light of the vertical display mode, then it may not be rotated outside the body of the GPS navigator totally when the navigator is in the horizontal mode.

SUMMARY OF THE INVENTION

As described above, GPS navigators having a display mode switchable according to the position of the navigators may make it more convenient for users to view the display when the navigators are operated in different ways. However, at present, the design of GPS navigators with a switchable display mode has not taken into account the relationship between antenna position and display mode. If the antenna is positioned in light of the vertical display mode, then it may not be able to receive and transmit signals well when the navigator is in the horizontal display mode. If the antenna is positioned in light of the horizontal display mode, then it may not be able to receive and transmit signals well when the navigator is in the vertical display mode. In order to solve the problem, the present invention provides a portable electronic device having a signal transmitter/receiver whose position may be changed according to the way in which the portable electronic device is operated.

A portable electronic device according to an exemplary embodiment of the present invention includes a body and a signal transmitter/receiver. A housing is formed on one end of the back of the body. A ball sleeve is formed on one corner of the housing. Also, a first rotation slot and a second rotation slot corresponding to the ball sleeve are formed on the housing. The signal transmitter/receiver has a ball spiral designed for being received in the ball sleeve, a rollable first ball corresponding to the first rotation slot, and a second rollable ball corresponding to the second rotation slot. The transmitter/receiver may be rotated around a first rotation axis defined by the first ball and the ball spiral, or may be rotated around a second rotation axis defined by the second ball and the ball spiral. Thus, the signal transmitter/receiver may have positions of an accommodating position that the signal transmitter/receiver is received in the housing, a first signal receiving position that the signal transmitter/receiver may be rotated outward around the first rotation axis, and a second signal receiving position that the signal transmitter/receiver may be rotated outward around the second rotation axis. Therefore, the position of the transmitter/receiver may be adjusted to better transmit or receive signals according to the position of the body.

In a portable electronic device according to an exemplary embodiment, a transmitter/receiver is connected to the housing by means of a non-fixed type of ball-and-sleeve structure, so that the transmitter/receiver may be rotated around the first rotation axis to a first signal receiving position, or may be rotated around the second rotation axis to a second signal receiving position. In both signal receiving positions, the signal transmitter/receiver may still be rotated outside totally and be located at the very end of the body of the portable electronic device, and point upward to the sky. Therefore, in both signal receiving positions, the signal transmitter/receiver may be adjusted to better transmit or receive signals according to the way the navigator is operated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The portable electronic devices of the present invention may be mobile phones, personal digital assistants (PDA), PDA phones, Smart phones, pocket PC's, hand-held PC's, and portable GPS devices. In the detailed illustration of the present invention below, a GPS navigator is used as an example.

Figure 1:
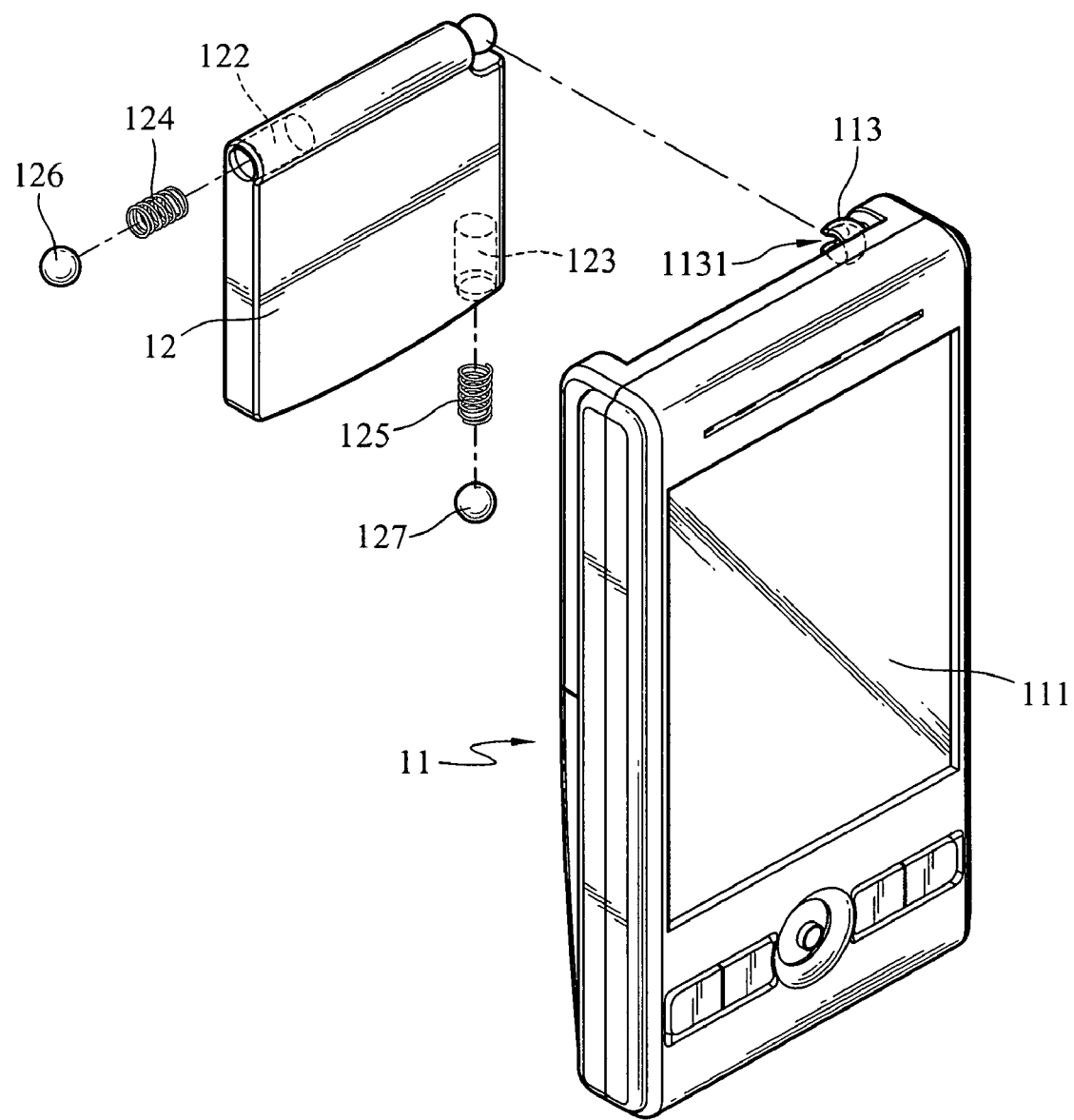
FIG. 1 is an exploded perspective view of a portable electronic device according to an exemplary embodiment of the present invention.
Figure 2:
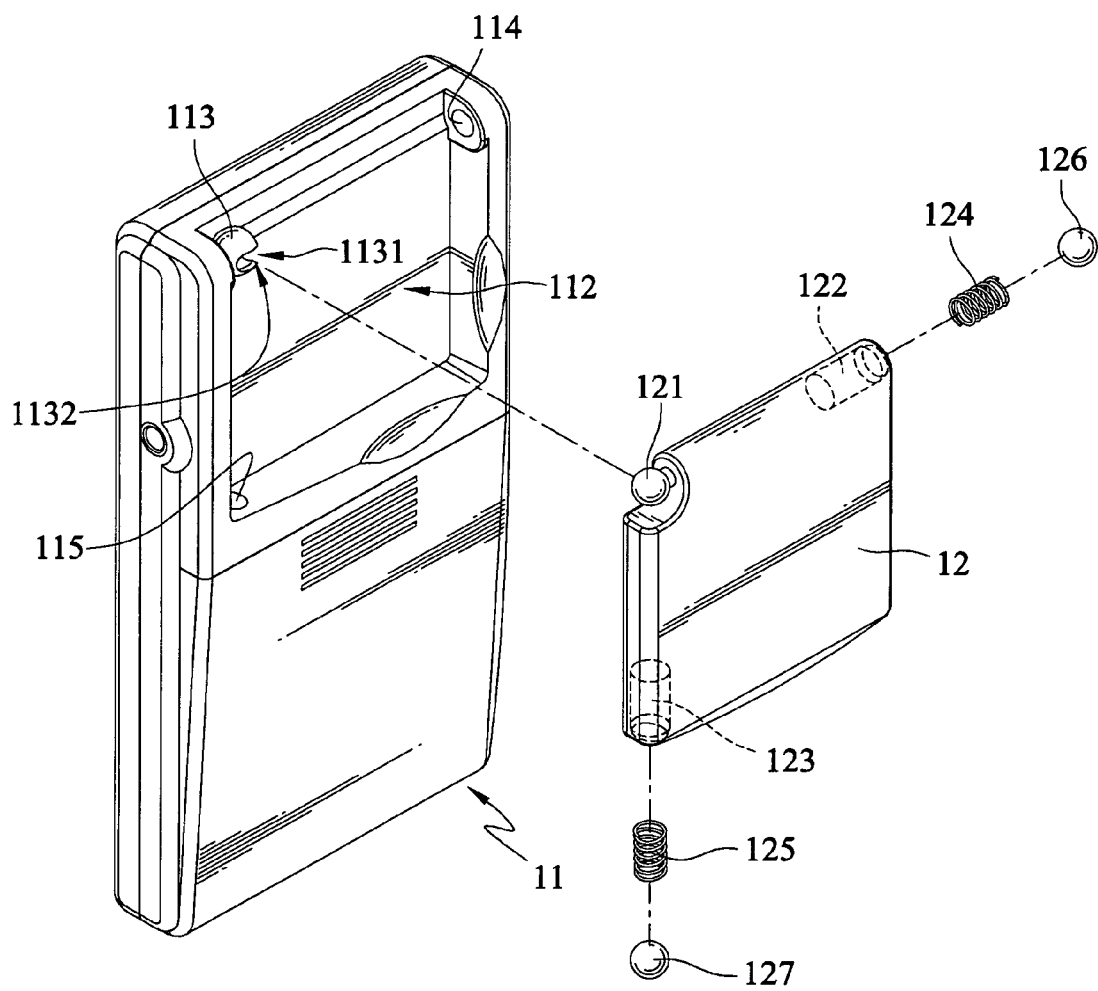
FIG. 2 is another exploded perspective view of the portable electronic device according to an exemplary embodiment of the present invention.
Figure 3A:
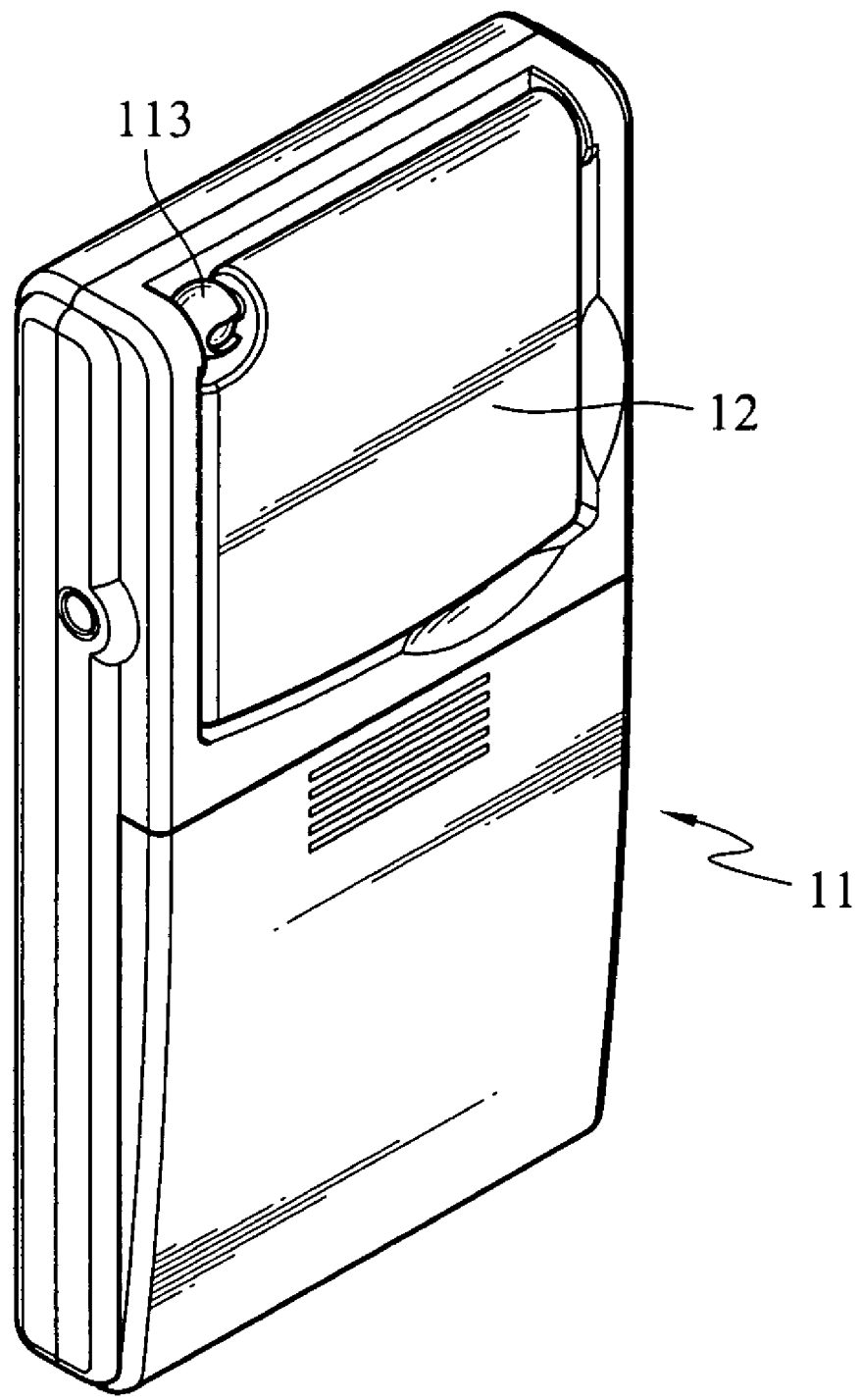
FIGS. 3A to 3E illustrate the operation of the portable electronic device according to an exemplary embodiment of the present invention.
Figure 3B:
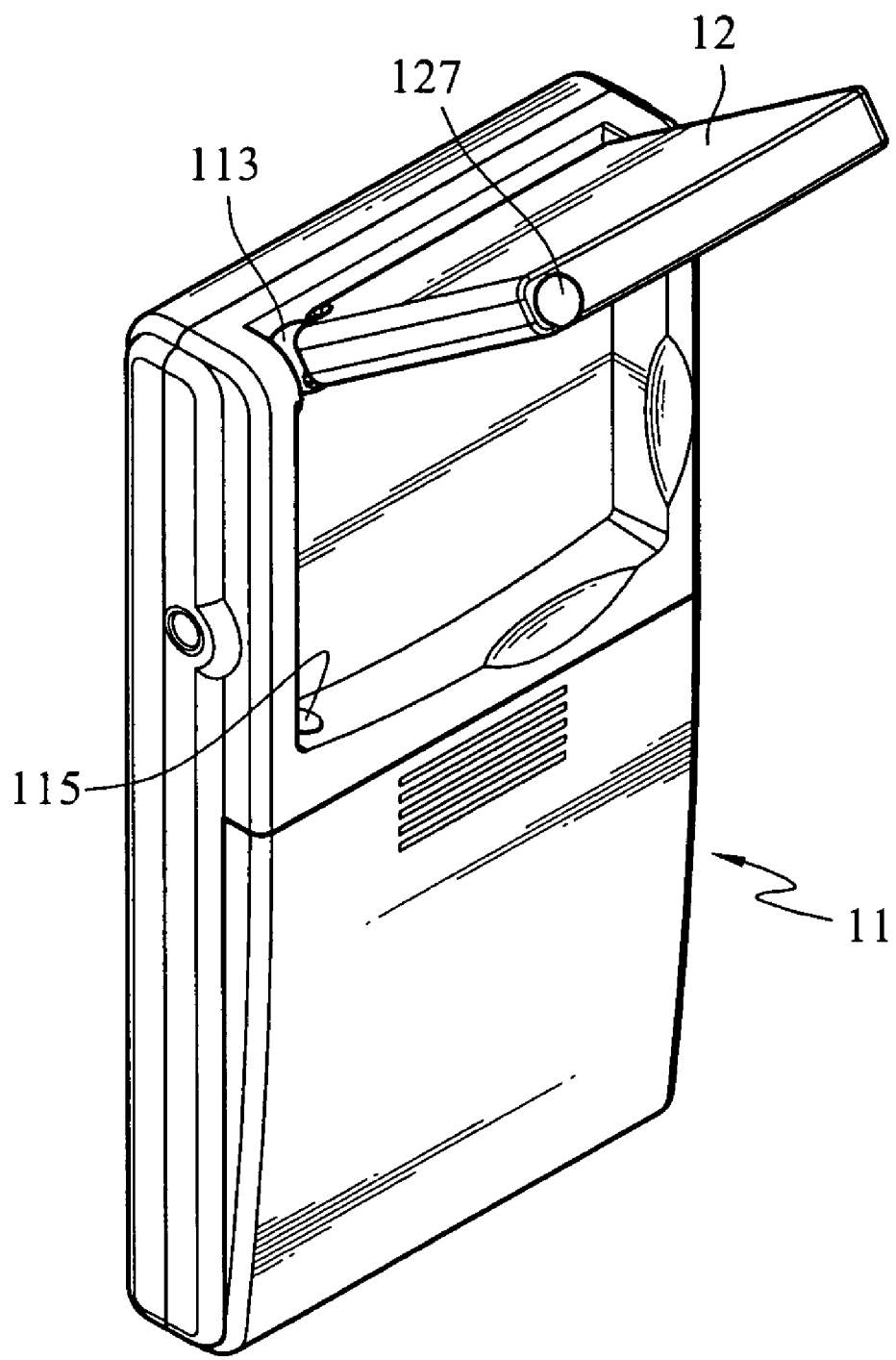
Figure 3C:
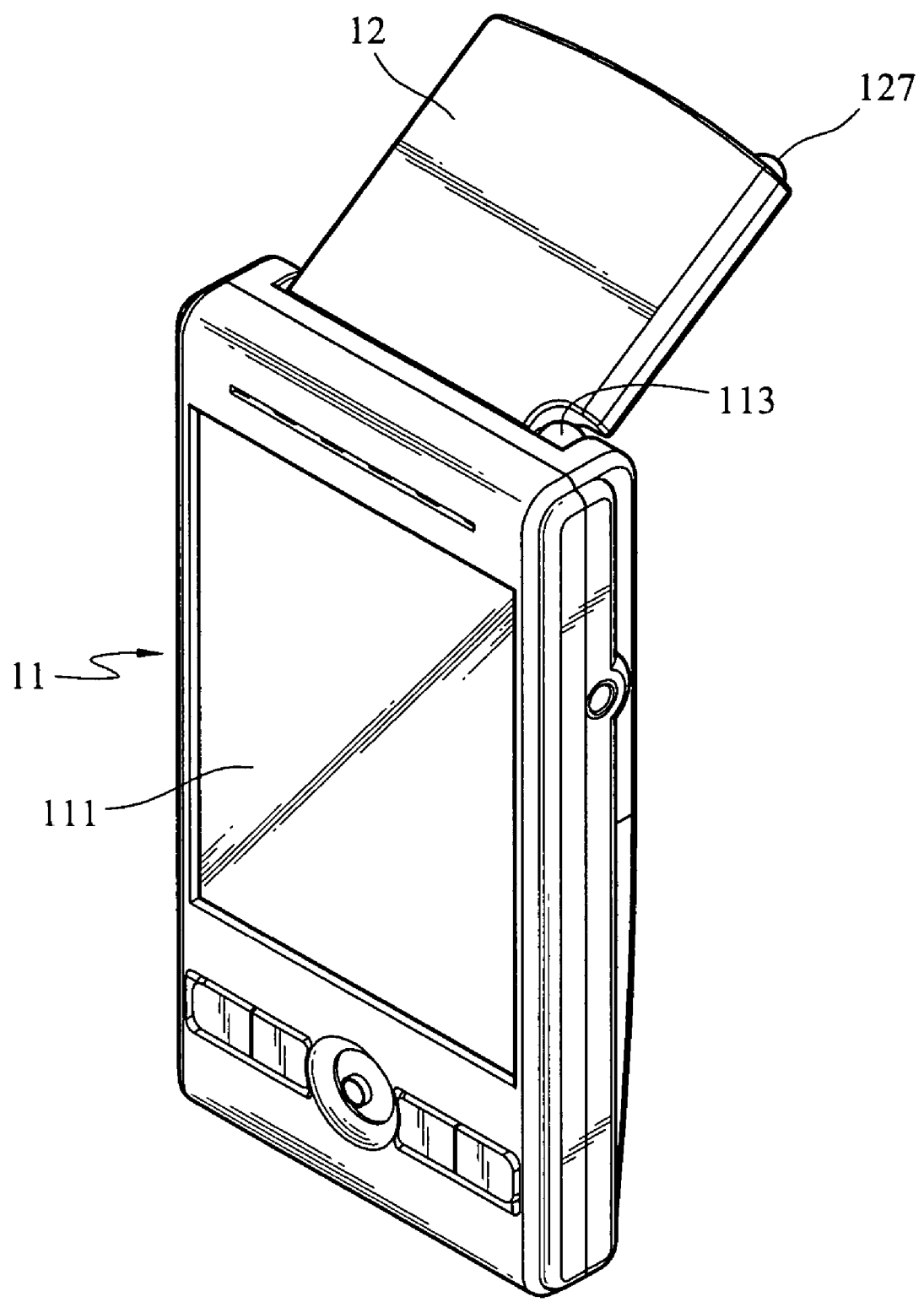
Figure 3D:
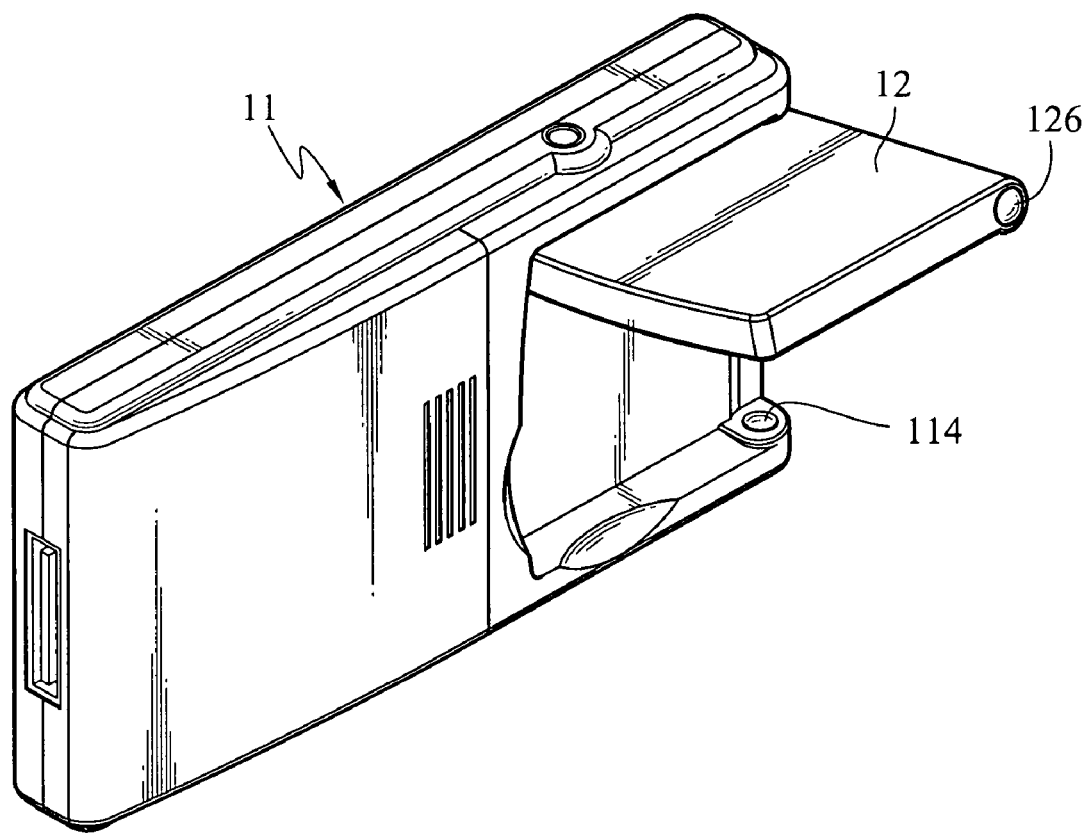
Figure 3E:
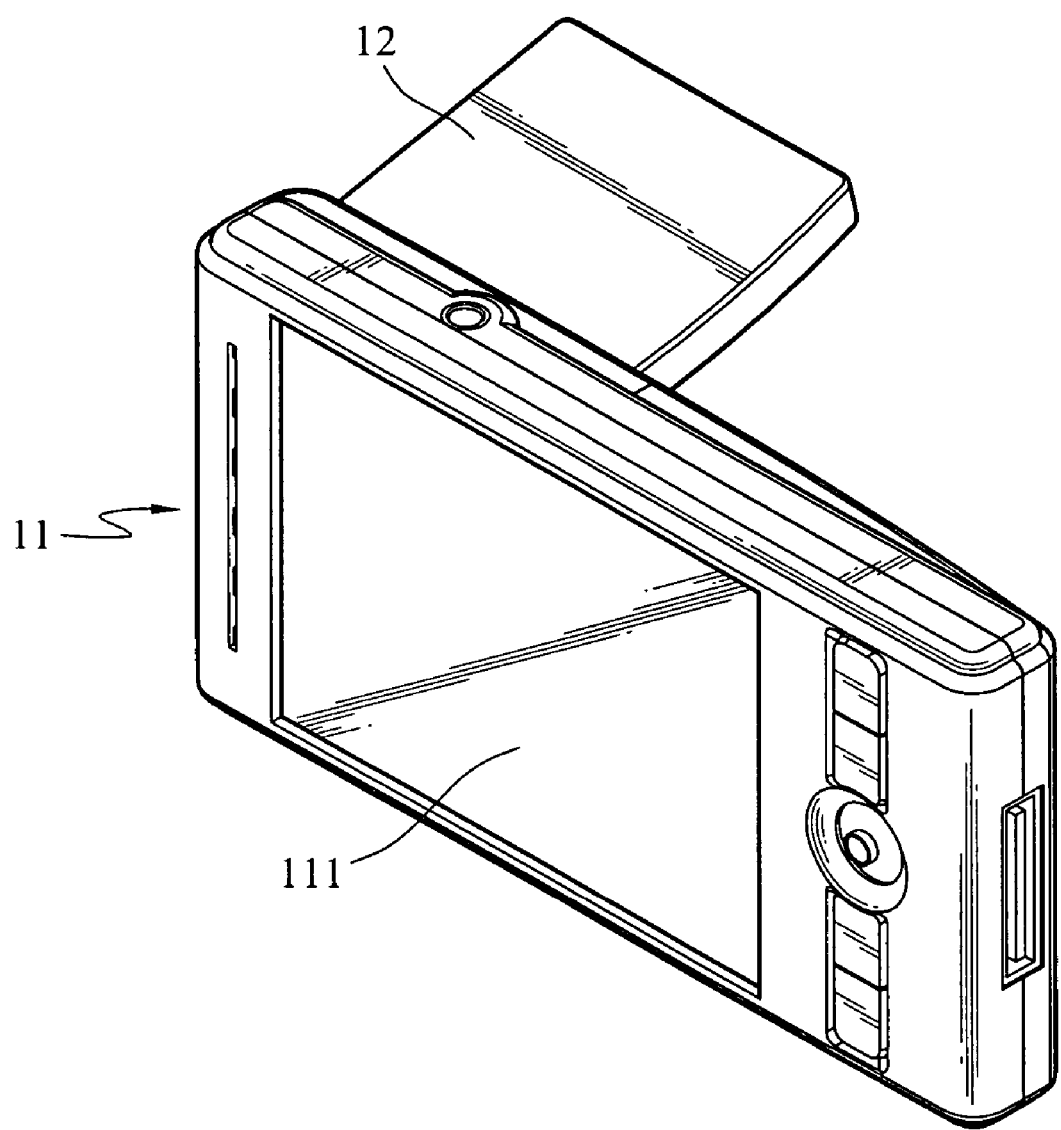

As shown in FIGS. 1, 2, and 3A, a portable electronic device according to an exemplary embodiment of the present invention includes a body 11 and a signal transmitter/receiver 12. The body 11 is of a rectangular shape and includes various electronic elements for processing electronic data (not shown in the drawings). There is a display 111 formed on the front of the body 11. A concave housing 112 is formed on one end of the back of the body 11. There is a ball sleeve 113 formed on the corner of the housing 112 adjacent to the end of the body 11. The ball sleeve 113 has a groove 1131 and an opening 1132. A first rotation slot 114 and a second rotation slot 115 are formed on the housing corresponding to the ball sleeve, wherein the ball sleeve 113 is a ¾ hollow ball and the groove 1131 is formed thereon. The first rotation slot 114 and the second rotation slot 115 are ¼ sphere concaves and form a diagonal. The ball sleeve 113 and the first rotation slot 114 thus define a first rotation axis X, and the ball sleeve 113 and the second rotation slot 115 define a second rotation axis Y. The first rotation axis X and the second rotation axis Y are perpendicular at the corner of the housing 112 adjacent to the end of the body 11.

The signal transmitter/receiver 12 is an antenna of a rectangular shape. The signal transmitter/receiver 12 is a little smaller than the housing 112 so that the antenna can be received in the housing 112. There is a ball spiral 121 formed on one corner of the signal transmitter/receiver 12, and cylinder slots 122 and 123 are formed on the two sides of the transmitter/receiver 12 that intersect at the ball spiral 121. Springs 124 and 125, a first ball 126, and a second ball 127 are located inside the cylinder slots 122 and 123, so that the first ball 126 and the second ball 127 protrude from the ends of the transmitter/receiver 12 when the springs 124 and 125 are under normal conditions. When a force is applied, the first ball 126 and the second ball 127 may be pushed inward in the cylinder slots 122 and 123 respectively. The ball spiral 121 can be fit into the ball sleeve 113 so that the signal transmitter/receiver 12 can be rotated around at least two rotation axes with the ball sleeve 113 as the rotation center.

As shown in FIGS. 3A to 3E, when a portable electronic device according to an exemplary embodiment of the present invention is not in use, the first ball 126 and the second ball 127 of the signal transmitter/receiver 12 are held in the first rotation slot 114 and the second rotation slot 115 respectively, and the signal transmitter/receiver 12 is received in the housing 112. Such a position of the signal transmitter/receiver is defined as an accommodating position. When a user operates the portable electric device in a vertical direction, the display 111 is in a first vertical display mode corresponding to the way of operation. When a user uses the electronic maps embedded in the portable electric device (GPS) for positioning, the signal transmitter/receiver 12 may be rotated outward around the first rotation axis X defined by the ball spiral 121 and the first ball 126, and the signal transmitter/receiver 12 may point up to the sky without any obstacles, the position of which is defined as the first signal receiving position. In the first signal receiving position, the navigator will be able to carry out the positioning function even during movement as long as data received from at least three satellites are available.

When a user operates the portable electric device in a horizontal direction, the display 111 is in a second horizontal display mode corresponding to the way of operation. When a user uses the electronic maps embedded in the portable electric device (GPS) for positioning, the signal transmitter/receiver 12 may be rotated outward around the second rotation axis Y defined by the ball spiral 121 and the second ball 127, and the transmitter/receiver 12 may point up to the sky without any obstacles, the position of which is defined as the second signal receiving position. A part of the ball spiral 121 is pushed into the opening 1132 of the ball sleeve 113 when the signal transmitter/receiver 12 is rotated outward around the second rotation axis Y. In the second signal receiving position, the navigator will be able to carry out the positioning function even during movement as long as data received from at least three satellites are available.

Whether in a first signal receiving position or a second signal receiving position, the signal transmitter/receiver 12 will be located at the very end of the body 11 and point upward to the sky. Therefore, the position of the transmitter/receiver may be adjusted to better transmit or receive signals according to the position of the body 11.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A portable electronic device, comprising: a body having a plurality of electronic elements; a display formed on a first surface of the body; a housing formed on a second surface of the body, wherein the body is operated in a vertical direction or a horizontal direction, the display has a first display mode and a second mode correspondingly, and a ball sleeve is formed at one corner of the housing; and a transmitter/receiver having a ball spiral, wherein the transmitter/receiver is pivotally connected to the ball sleeve by connecting the ball spiral and the ball sleeve comprising a groove and an opening, so that the transmitter/receiver can be rotated around the ball spiral with the groove, rotated to a first signal receiving position corresponding to the first display mode of the display with the groove, rotated to a second signal receiving position corresponding to the second display mode of the display with the groove via the opening, or in an accommodating position when the transmitter/receiver is received in the housing, wherein the housing has a first rotation slot and a second rotation slot corresponding to the two sides of the ball spiral, which intersect at the ball spiral, a first ball and a second ball being located in the two sides of the transmitter/receiver respectively, wherein the first ball and the second ball are in the first rotation slot and the second slot respectively when the transmitter/receiver is in the accommodating position.

2. The portable electronic device of claim 1, wherein each of the two sides of the transmitter/receiver, which intersect at the ball spiral, has a cylinder slot with a spring inside, wherein the first ball and the second ball are placed in the cylinder slots of the two sides, and protrude from the transmitter/receiver due to the elasticity of the springs.

3. The portable electronic device of claim 1, wherein the signal transmitter/receiver is an antenna.

4. A portable electronic device, comprising:
a body having a plurality of electronic elements;
a display formed on a first surface of the body;
a housing formed on a second surface of the body, wherein the body is operated in a vertical direction or a horizontal direction, the display has a first display mode and a second mode correspondingly, and a ball sleeve is formed at one corner of the housing, a first rotation slot and a second slot are formed on the housing corresponding to the two sides of the ball spiral; and
a signal transmitter/receiver having a ball spiral, a rollable first ball, and a rollable second ball, wherein the ball spiral is pivotally connected to the ball sleeve comprising a groove and an opening, so that the transmitter/receiver can be rotated around a rotation axis defined by the first ball and the ball spiral with the groove, or rotated around a rotation axis defined by the second ball and the ball spiral with the groove, therefore, the signal transmitter/receiver can be in an accommodating position when the signal transmitter/receiver is received in the housing, can be rotated to a first signal receiving position corresponding to the first display mode of the display with the groove, or rotated to a second signal receiving position corresponding to the second display mode of the display with the groove via the opening.

5. The portable electronic device of claim 4, wherein each of the two sides of the transmitter/receiver, which intersect at the ball spiral, has a cylinder slot with a spring inside, wherein the first ball and the second ball are placed in the cylinder slots of the two sides, and protrude from the signal transmitter/ receiver due to the elasticity of the springs.

6. The portable electronic device of claim 4, wherein the signal transmitter/receiver is an antenna.

\* \* \* \* \*

UNITED STATES PATENT AND TRADEMARK OFFICE
CERTIFICATE OF CORRECTION

PATENT NO. : 7,590,433 B2
APPLICATION NO. : 11/327443
DATED : September 15, 2009
INVENTOR(S) : Sung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 905 days.

Signed and Sealed this

Twenty-first Day of September, 2010

David J. Kappos
*Director of the United States Patent and Trademark Office*